United States Patent
Kakishima et al.

(10) Patent No.: US 11,456,839 B2
(45) Date of Patent: Sep. 27, 2022

(54) USER EQUIPMENT AND WIRELESS COMMUNICATION METHOD

(71) Applicants: NTT DOCOMO, INC., Chiyoda-ku (JP); DOCOMO INNOVATIONS, INC., Palo Alto, CA (US)

(72) Inventors: Yuichi Kakishima, Tokyo (JP); Chongning Na, Tokyo (JP); Kazuaki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 69 days.

(21) Appl. No.: 16/483,276

(22) PCT Filed: Feb. 2, 2018

(86) PCT No.: PCT/US2018/016710
§ 371 (c)(1),
(2) Date: Aug. 2, 2019

(87) PCT Pub. No.: WO2018/144920
PCT Pub. Date: Aug. 9, 2018

(65) Prior Publication Data
US 2020/0028655 A1    Jan. 23, 2020

Related U.S. Application Data

(60) Provisional application No. 62/454,480, filed on Feb. 3, 2017.

(51) Int. Cl.
*H04L 5/00* (2006.01)
*H04W 76/27* (2018.01)
(Continued)

(52) U.S. Cl.
CPC .......... *H04L 5/0073* (2013.01); *H04L 1/0026* (2013.01); *H04L 5/0051* (2013.01);
(Continued)

(58) Field of Classification Search
None
See application file for complete search history.

(56) References Cited

U.S. PATENT DOCUMENTS

2014/0036796 A1*  2/2014  Etemad ............... H04L 45/306
                                             370/329
2014/0126496 A1    5/2014  Sayana et al.
(Continued)

FOREIGN PATENT DOCUMENTS

JP    2015-535403 A    12/2015
WO    2016/204546 A1   12/2016

OTHER PUBLICATIONS

Office Action issued in the counterpart European Patent Application No. 18708505.5, dated Dec. 18, 2020 (8 pages).
International Search Report for corresponding International Application No. PCT/US2018/016710, dated Apr. 12, 2018 (5 pages).
Written Opinion for corresponding International Application No. PCT/US2018/016710, dated Apr. 12, 2018 (8 pages).
(Continued)

*Primary Examiner* — Alex Skripnikov
(74) *Attorney, Agent, or Firm* — Osha Bergman Watanabe & Burton LLP (57) ABSTRACT

A user equipment (UE) is disclosed including a receiver that receives, from a base station (BS), Zero Power (ZP) Channel State Information-Reference Signal (CSI-RS) resource configuration information and a ZP CSI-RS. The ZP CSI-RS is transmitted as a periodic ZP CSI-RS, a semi-persistent ZP CSI-RS, or an aperiodic ZP CSI-RS. When the ZP-CSI-RS is transmitted as the periodic ZP CSI-RS or the semi-persistent ZP CSI-RS, the ZP CSI-RS resource configuration information designates periodicity and a timing offset for the periodic ZP CSI RS or the semi-persistent ZP-CSI-RS. The receiver receives the ZP CSI-RS based on a ZP CSI RS resource specified using the periodicity and the timing offset. When the ZP CSI-RS is transmitted as the aperiodic ZP CSI-RS, the receiver receives DCI that triggers the aperiodic
(Continued)

ZP CSI-RS. The receiver receives the ZP CSI-RS based on a ZP CSI-RS resource specified using the DCI.

5 Claims, 12 Drawing Sheets

(51) Int. Cl.
 *H04L 1/00* (2006.01)
 *H04W 72/04* (2009.01)
 *H04W 80/02* (2009.01)

(52) U.S. Cl.
 CPC ......... *H04L 5/0098* (2013.01); *H04W 72/042* (2013.01); *H04W 76/27* (2018.02); *H04W 80/02* (2013.01)

(56) References Cited

U.S. PATENT DOCUMENTS

| | | | |
|---|---|---|---|
| 2015/0078272 A1 | 3/2015 | Kim et al. | |
| 2016/0028448 A1* | 1/2016 | Park | H04B 7/0639 375/267 |
| 2017/0034731 A1* | 2/2017 | Lee | H04L 5/0073 |
| 2018/0175983 A1* | 6/2018 | Yum | H04L 5/0053 |
| 2019/0190673 A1* | 6/2019 | Kwak | H04L 27/2611 |
| 2019/0215096 A1* | 7/2019 | Kim | H04L 5/00 |
| 2020/0007287 A1* | 1/2020 | Kakishima | H04J 1/02 |
| 2020/0187215 A1* | 6/2020 | Yum | H04W 72/08 |

OTHER PUBLICATIONS

Huawei et al.; "Considerations on two-level configuiation of CSI acquisition settings", 3GPP Draft; R1-1700057; 3GPP RAN WG1 NR Ad Hoc Meeting; Spokane, USA; Jan. 16-20, 2017 (5 pages).
CATT; "Discussion on CSI reporting in NR"; 3GPP Draft, R1-1700224; 3GPP TSG RAN WG1 AH_NR Meeting; Spokane, USA; Jan. 16-20, 2017 (4 page).
NTT Docomo; "CSI Acquisition Schemes for NR", 3GPP Draft; R-1700596; 3GPP TSG RAN WG1 NR Ad-Hoc Meeting; Spokane, USA; Jan. 16-20, 2017 (5 page).
Zte at al; "Discussion on Measurement and RS Design for CLI Mitigation", 3GPP Draft; R1-1700271; 3GPP TSG RAN NG1 AH_NR#1 Meeting; Spokane, USA; Jan. 16-20, 2017 (8 page).
LG Electronics; "Discussion on CSI measurement framework". GPP Draft; R1-1611822; 3GPP TSG RAN WG1 Meeting #87; Reno, USA; Nov. 14-18, 2016 (6 pages).
Office Action in counterpart European Patent Application No. 18 708 505.5 dated Aug. 19, 2021 (8 pages).
Office Action in counterpart Japanese Patent Application No. 2019-542198 dated Feb. 22, 2022 (6 pages).
Ericsson; "On Dynamic Signalling for Aperiodic and Semi-Persistent CSI-RS"; 3GPP TSG-RAN WG1 #87ah-NR, R1-1700761; Spokane, WA, USA; Jan. 16-20, 2017 (4 pages).
Office Action in counterpart Chinese Patent Application No. 201880010319.9 dated Apr. 12, 2022 (19 pages).
Office Action in counterpart European Patent Application No. 18 708 505.5 dated May 3, 2022 (8 pages).

* cited by examiner

Mapping from CSI-RS configuration to $(k', l')$ for normal cyclic prefix

| | CSI-RS configuration | Number of CSI reference signals configured | | | | | |
|---|---|---|---|---|---|---|---|
| | | 1 or 2 | | 4 | | 8 | |
| | | $(k',l')$ | $n_s \bmod 2$ | $(k',l')$ | $n_s \bmod 2$ | $(k',l')$ | $n_s \bmod 2$ |
| Frame structure type 1 and 2 | 0 | (9,5) | 0 | (9,5) | 0 | (9,5) | 0 |
| | 1 | (11,2) | 1 | (11,2) | 1 | (11,2) | 1 |
| | 2 | (9,2) | 1 | (9,2) | 1 | (9,2) | 1 |
| | 3 | (7,2) | 1 | (7,2) | 1 | (7,2) | 1 |
| | 4 | (9,5) | 1 | (9,5) | 1 | (9,5) | 1 |
| | 5 | (8,5) | 0 | (8,5) | 0 | | |
| | 6 | (10,2) | 1 | (10,2) | 1 | | |
| | 7 | (8,2) | 1 | (8,2) | 1 | | |
| | 8 | (6,2) | 1 | (6,2) | 1 | | |
| | 9 | (8,5) | 1 | (8,5) | 1 | | |
| | 10 | (3,5) | 0 | | | | |
| | 11 | (2,5) | 0 | | | | |
| | 12 | (5,2) | 1 | | | | |
| | 13 | (4,2) | 1 | | | | |
| | 14 | (3,2) | 1 | | | | |
| | 15 | (2,2) | 1 | | | | |
| | 16 | (1,2) | 1 | | | | |
| | 17 | (0,2) | 1 | | | | |
| | 18 | (3,5) | 1 | | | | |
| | 19 | (2,5) | 1 | | | | |
| Frame structure type 2 only | 20 | (11,1) | 1 | (11,1) | 1 | (11,1) | 1 |
| | 21 | (9,1) | 1 | (9,1) | 1 | (9,1) | 1 |
| | 22 | (7,1) | 1 | (7,1) | 1 | (7,1) | 1 |
| | 23 | (10,1) | 1 | (10,1) | 1 | | |
| | 24 | (8,1) | 1 | (8,1) | 1 | | |
| | 25 | (6,1) | 1 | (6,1) | 1 | | |
| | 26 | (5,1) | 1 | | | | |
| | 27 | (4,1) | 1 | | | | |
| | 28 | (3,1) | 1 | | | | |
| | 29 | (2,1) | 1 | | | | |
| | 30 | (1,1) | 1 | | | | |
| | 31 | (0,1) | 1 | | | | |

FIG. 3B

Mapping from CSI reference signal configuration to $(k', l')$ for extended cyclic prefix

|  | CSI-RS configuration | Number of CSI-RSs configured | | | | | |
|---|---|---|---|---|---|---|---|
|  |  | 1 or 2 | | 4 | | 8 | |
|  |  | $(k',l')$ | $n_s \bmod 2$ | $(k',l')$ | $n_s \bmod 2$ | $(k',l')$ | $n_s \bmod 2$ |
| Frame structure type 1 and 2 | 0 | (11,4) | 0 | (11,4) | 0 | (11,4) | 0 |
|  | 1 | (9,4) | 0 | (9,4) | 0 | (9,4) | 0 |
|  | 2 | (10,4) | 1 | (10,4) | 1 | (10,4) | 1 |
|  | 3 | (9,4) | 1 | (9,4) | 1 | (9,4) | 1 |
|  | 4 | (5,4) | 0 | (5,4) | 0 |  |  |
|  | 5 | (3,4) | 0 | (3,4) | 0 |  |  |
|  | 6 | (4,4) | 1 | (4,4) | 1 |  |  |
|  | 7 | (3,4) | 1 | (3,4) | 1 |  |  |
|  | 8 | (8,4) | 0 |  |  |  |  |
|  | 9 | (6,4) | 0 |  |  |  |  |
|  | 10 | (2,4) | 0 |  |  |  |  |
|  | 11 | (0,4) | 0 |  |  |  |  |
|  | 12 | (7,4) | 1 |  |  |  |  |
|  | 13 | (6,4) | 1 |  |  |  |  |
|  | 14 | (1,4) | 1 |  |  |  |  |
|  | 15 | (0,4) | 1 |  |  |  |  |
| Frame structure type 2 only | 16 | (11,1) | 1 | (11,1) | 1 | (11,1) | 1 |
|  | 17 | (10,1) | 1 | (10,1) | 1 | (10,1) | 1 |
|  | 18 | (9,1) | 1 | (9,1) | 1 | (9,1) | 1 |
|  | 19 | (5,1) | 1 | (5,1) | 1 |  |  |
|  | 20 | (4,1) | 1 | (4,1) | 1 |  |  |
|  | 21 | (3,1) | 1 | (3,1) | 1 |  |  |
|  | 22 | (8,1) | 1 |  |  |  |  |
|  | 23 | (7,1) | 1 |  |  |  |  |
|  | 24 | (6,1) | 1 |  |  |  |  |
|  | 25 | (2,1) | 1 |  |  |  |  |
|  | 26 | (1,1) | 1 |  |  |  |  |
|  | 27 | (0,1) | 1 |  |  |  |  |

ZP CSI-RS resource configuration

| | |
|---|---|
| Resource index | 1, 2, 3, ... |
| Number of APs | e.g., 1, 2, 4, 8, ... |
| Mutliplexing timing | Time domain behaviour (e.g., Periodic, Semi-persistent, and Apriodic)<br>Periodicity and Slot offset for Periodic or Semi-persistent ZP CSI-RS |
| Multiplexing frequency location | e.g., Wideband/Subband (index)/Partial band |
| RE multiplexing location | CSI-RS configuration |
| RS type | e.g., SS/MRS/DM-RS/SRS |

IMR configuration

| Resource index | 1, 2, 3, ... |
|---|---|
| Number of APs | e.g., 1, 2, 4, 8, ... |
| Mutliplexing timing | Time domain behaviour (e.g., Periodic, Semi-persistent, and Apriodic)<br>Periodicity and Slot offset for Periodic or Semi-persistent IMR |
| Multiplexing frequency location | e.g., Wideband/Subband (index)/Partial band |
| RE multiplexing location | IMR configuration |
| RS type | e.g., SS/MRS/DM-RS/SRS |

USER EQUIPMENT AND WIRELESS COMMUNICATION METHOD

TECHNICAL FIELD

The present invention generally relates to a user equipment and a wireless communication method of resource allocation of a zero-power (ZP) CSI-Reference Signal (RS).

BACKGROUND ART

In a legacy Long Term Evolution (LTE) system such as a release 13 (Rel. 13) LTE-Advanced (LTE-A) system, a CSI acquisition scheme supporting zero-power (ZP) CSI-RS was introduced to cope with inter-cell interference that degrades accuracy of CSI acquisition. When a user equipment (UE) is configured with a ZP CSI-RS resource, the UE assumes that rate matching is applied to the resource element (RE), for example, a Physical Downlink Shared Channel (PDSCH) is not multiplexed to the REs for the ZP CSI-RS. Typically, the ZP CSI-RS resource is scheduled to align with the non-zero power (NZP) CSI-RS resources for the neighboring cells. Additionally, the Rel. 13 LTE standard supports only periodic CSI-RS transmission. The ZP CSI-RS resource is also used as an interference measurement resource (IMR). For instance, UE can measure all the interference power using ZP CSI-RS resource element (RE), in which desired signal is muted.

On the other hand, in a New Radio (NR) (Fifth Generation (5G) system, further flexibility on NZP CSI-RS is supported such as periodic/aperiodic/semi-persistent CSI-RS transmission. As a result, whether the CSI-RS is transmitted to the neighboring cell is dynamically changed. In order to achieve efficient resource utilization for the NZP CSI-RS, further flexibility is required for the ZP CSI-RS resource as well.

In addition, in a conventional resource configuration in the legacy LTE system, the ZP CSI-RS resource uses the REs for 4-port CSI-RS. Therefore, if the NR system apply the conventional resource configuration, scheduling of the ZP CSI-RS resource may be restricted.

CITATION LIST

NON-PATENT REFERENCE

[Non-Patent Reference 1] 3GPP, TS 36.211 V 14.1.0
[Non-Patent Reference 2] 3GPP, TS 36.213 V14.1.0

SUMMARY OF THE INVENTION

One or more embodiments of the present invention relate to a user equipment (UE) in a wireless communication system including a receiver that receives, from a base station (BS), Zero Power (ZP) Channel State Information-Reference Signal (CSI-RS) resource configuration information and a ZP CSI-RS. The ZP CSI-RS is transmitted as a periodic ZP CSI-RS, a semi-persistent ZP CSI-RS, or an aperiodic ZP CSI-RS. When the ZP CSI-RS is transmitted as the periodic ZP CSI-RS or the semi-persistent ZP CSI-RS, the ZP CSI-RS resource configuration information designates periodicity and a timing offset for the periodic ZP CSI-RS or the semi-persistent ZP CSI-RS. The receiver receives the ZP CSI-RS based on a ZP CSI-RS resource specified using the periodicity and the timing offset.

One or more embodiments of the present invention relate to a user equipment (UE) in a wireless communication system including a receiver that receives, from a base station (BS), Interference Measurement Resource (IMR) configuration information, and an IMR. The ZP CSI-RS is transmitted as a periodic IMR, a semi-persistent IMR, or an aperiodic IMR. When the IMR is transmitted as the periodic IMR or the semi-persistent IMR, the IMR resource configuration information designates periodicity and a timing offset for the periodic IMR or the semi-persistent IMR. The receiver receives the IMR based on a IMR resource specified using the periodicity and the timing offset.

One or more embodiments of the present invention relate to a method of acquiring CSI in a wireless communication system including transmitting, from a BS to a UE, ZP CSI-RS resource configuration information. The method includes receiving, with the UE, a ZP CSI-RS from the BS. The ZP CSI-RS is transmitted as a periodic ZP CSI-RS, a semi-persistent ZP CSI-RS, or an aperiodic ZP CSI-RS. When the ZP-CSI-RS is transmitted as the periodic ZP CSI-RS or the semi-persistent ZP-CSI-RS, the ZP CSI-RS resource configuration information designates periodicity and a timing offset for the periodic ZP CSI-RS or the semi-persistent ZP-CSI-RS. The receiving receives the ZP CSI-RS based on a ZP CSI-RS resource specified using the periodicity and the timing offset.

According to one or more embodiments of the present invention, enhanced flexibility on the scheduling of ZP CSI-RS resources can be realized.

DETAILED DESCRIPTION OF EMBODIMENTS

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1A:
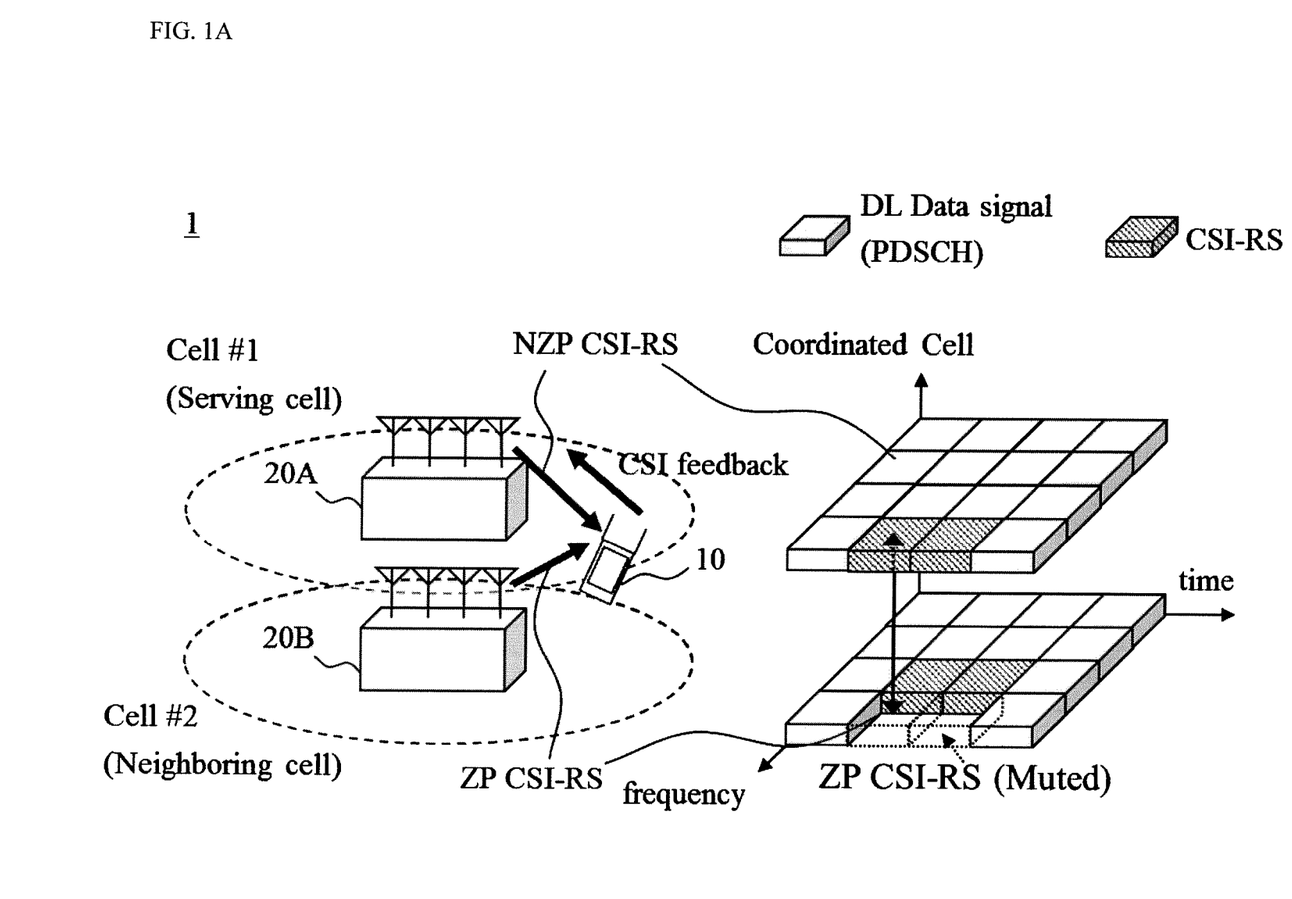
FIGS. 1A and 1B are a diagram showing a configuration of a wireless communication system according to one or more embodiments of the present invention.
Figure 1B:
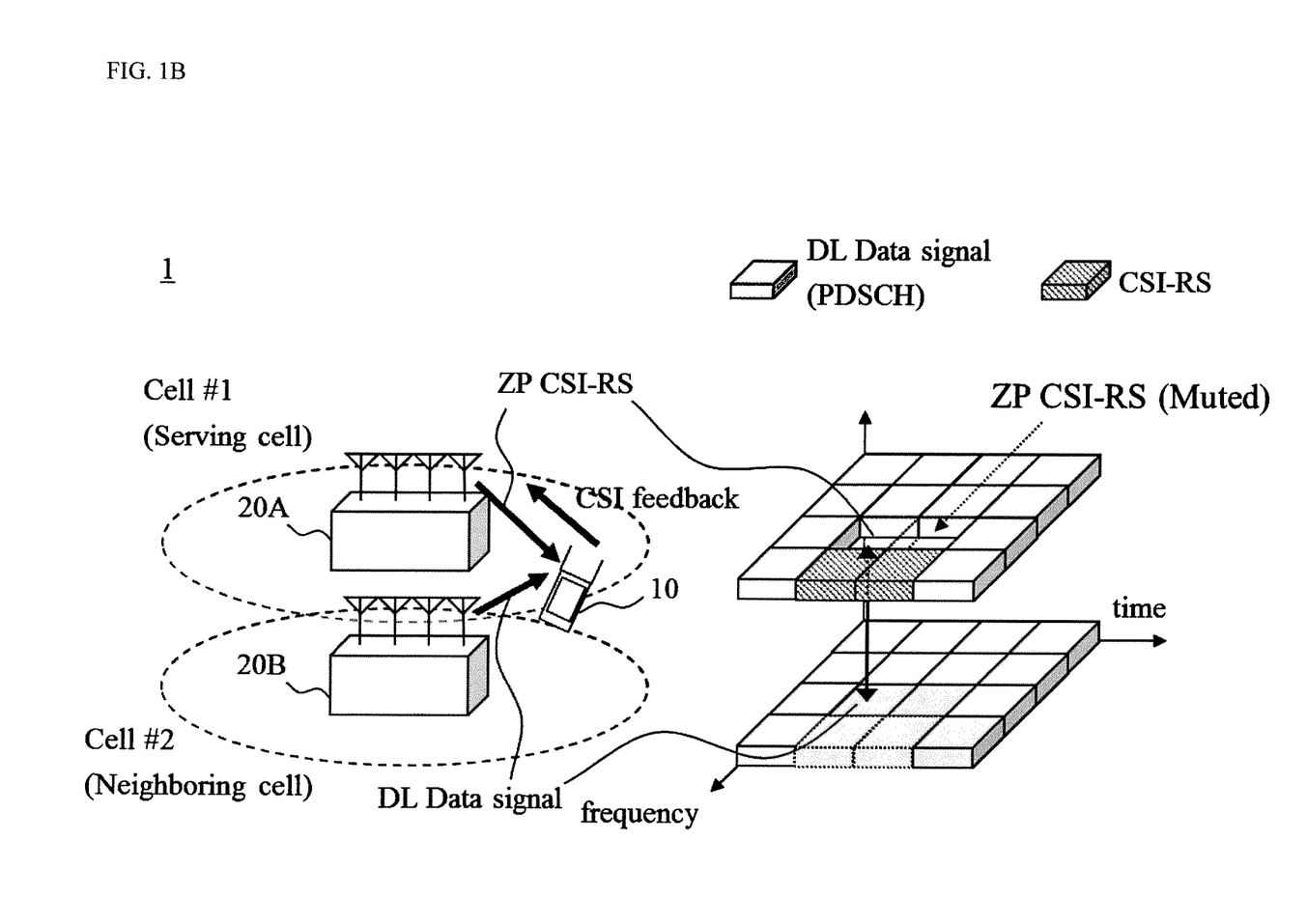

FIGS. 1A and 1B are a diagram showing a wireless communications system 1 according to one or more embodiments of the present invention. The wireless communication system 1 includes a user equipment (UE) 10 and base stations (BSs) 20A and 20B. The wireless communication system 1 may be a New Radio (NR) system. The wireless communication system 1 is not limited to the specific configurations described herein and may be any type of wireless communication system such as an LTE/LTE-Advanced (LTE-A) system.

The BS 20 may communicate uplink (UL) and downlink (DL) signals with the UE 10 in a cell of the BS 20. The DL and UL signals may include control information and user data. The BS 20 may be a gNodeB (gNB).

The BS 20 includes antennas, a communication interface to communicate with an adjacent BS 20 (for example, X2 interface), a communication interface to communicate with a core network (for example, S1 interface), and a CPU (Central Processing Unit) such as a processor or a circuit to process transmitted and received signals with the UE 10. Operations of the BS 20 may be implemented by the processor processing or executing data and programs stored in a memory. However, the BS 20 is not limited to the hardware configuration set forth above and may be realized by other appropriate hardware configurations as understood by those of ordinary skill in the art. Numerous BSs 20 may be disposed so as to cover a broader service area of the wireless communication system 1.

The UE 10 may communicate DL and UL signals that include control information and user data with the BS 20 using MIMO technology. The UE 10 may be a mobile station, a smartphone, a cellular phone, a tablet, a mobile router, or information processing apparatus having a radio communication function such as a wearable device.

The UE 10 includes a CPU such as a processor, a RAM (Random Access Memory), a flash memory, and a radio communication device to transmit/receive radio signals to/from the BS 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

In one or more embodiments of the present invention, the wireless communication system 1 supports a Channel State Information (CSI) acquisition scheme using a zero-power (ZP) CSI-Reference Signal (RS) for high accurate CSI estimation. Resource element(s) (RE(s)) designated as the ZP CSI-RS may be muted. This makes it possible to improve accuracy of the CSI estimation on the muted RE(s). For example, a non-zero-power (NZP) CSI-RS may be transmitted from a serving cell and any signals/channels may not be transmitted from neighboring cells (the ZP CSI-RS may be applied in the neighboring cells). As shown in FIG. 1A, the BS 20A (serving cell) may transmit the NZP CSI-RS. The BS 20B (neighboring cell) may transmit the ZP CSI-RS (muting). Then, the UE 10 may transmit CSI feedback to the BS 20A (serving cell) in response to the NZP CSI-RS.

In one or more embodiments of the present invention, the wireless communication system 1 supports an interference measurement using the ZP CSI-RS for flexible interference measurement. The RE(s) designated as the ZP CSI-RS may be muted. This makes it possible to improve flexibility of the interference measurement on the muted RE(s). For example, any signals/channels may not be transmitted from a serving cell and signals/channels may be transmitted from neighboring cells (the ZP CSI-RS may be applied in the serving cell). As shown in FIG. 1B, the BS 20A may multiplex and transmit the ZP CSI-RS. The BS 20B (neighboring cell) may transmit a DL data signal. Then, the UE 10 may transmit CSI feedback to the BS 20A (serving cell) (or the ZP CSI-RS from the serving cell and the DL data signal from the neighboring cell interfere mutually. Here, usage of ZP CSI-RS is not limited to the measurement of inter-cell interference but applicable to some other measurements, e.g., inter-user interference measurement for multi-user (MU)-MIMO. In addition, ZP CSI-RS is not used only for measuring downlink signals but also used to measure uplink or sidelink signals.

Next, the CSI-RS resources according to one or more embodiments of the present invention will be described below, with reference to FIGS. 2, 3A, and 3B.

Figure 2:
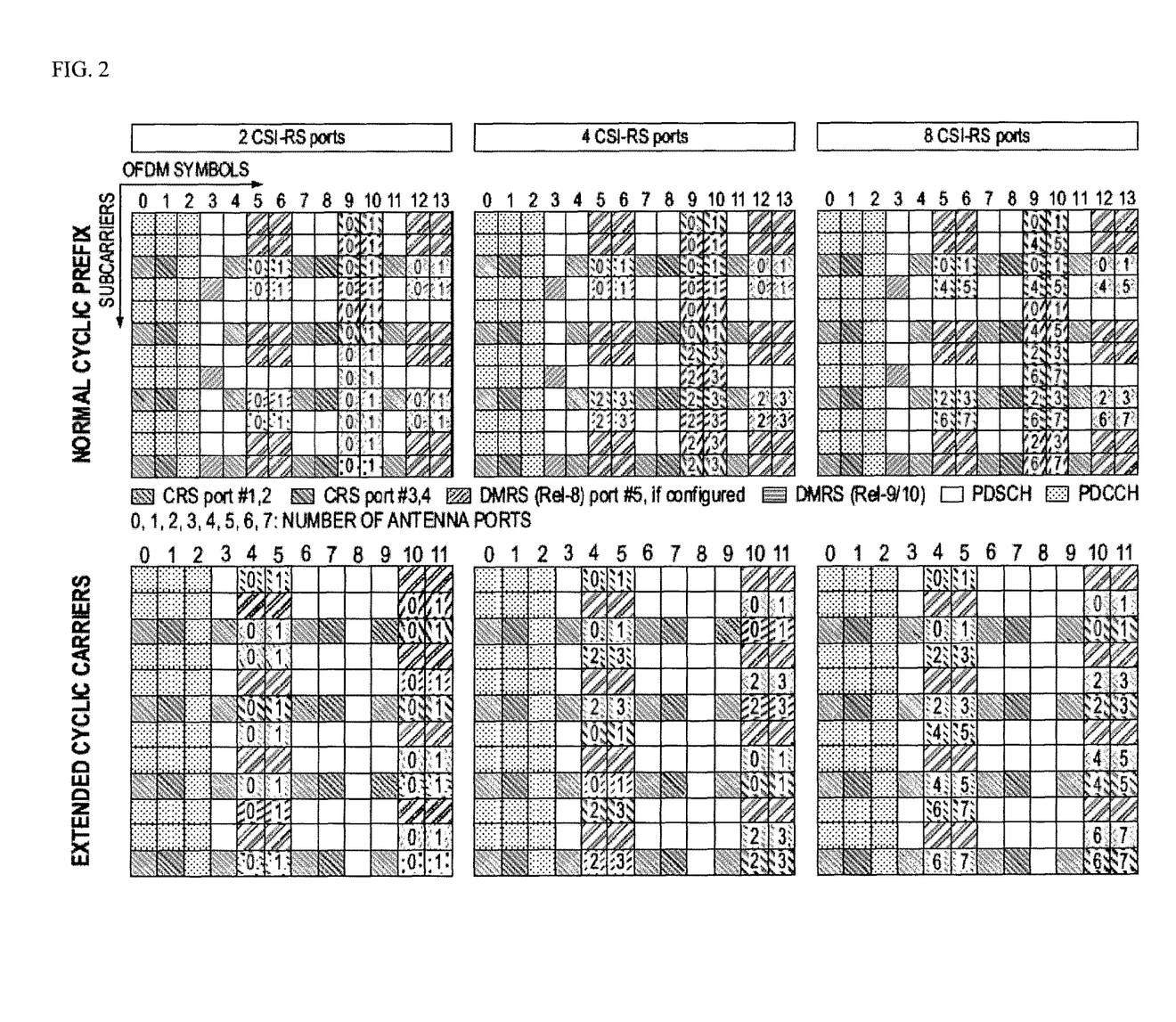
FIG. 2 is a diagram showing resource elements (REs) allocated to the CSI-RS antenna ports in a resource block (RB) according to one or more embodiments of the present invention.

FIG. 2 is a diagram showing REs allocated to the CSI-RS antenna ports (APs) in a resource block (RB) for a normal cyclic prefix and an extended cyclic prefix according to one or more embodiments of the present invention. As shown in FIG. 2, one axis designates Orthogonal Frequency Division Multiplexing (OFDM) symbols and the other axis designates subcarriers. Each block corresponds to the RE in the RB and the hatched REs with the number of APs are allocated to the CSI-RS APs. Furthermore, as shown in FIG. 2, two REs are allocated to the CSI-RS APs when the BS designates two CSI-RS APs. Moreover, four REs are allocated to the CSI-RS APs when the BS designates four CSI-RS APs, and eight REs are allocated to the CSI-RS APs when the BS designates eight CSI-RS APs. Furthermore, the conventional ZP CSI-RS resource in the legacy LTE standard (e.g., Rel. 13 LTE) is notified using the REs mapped to the 4-port CSI-RS (RE mapping for 4-port CSI-RS). That is, the conventional ZP CSI-RS resources can be designated only in a unit of four REs.

Figure 3A:
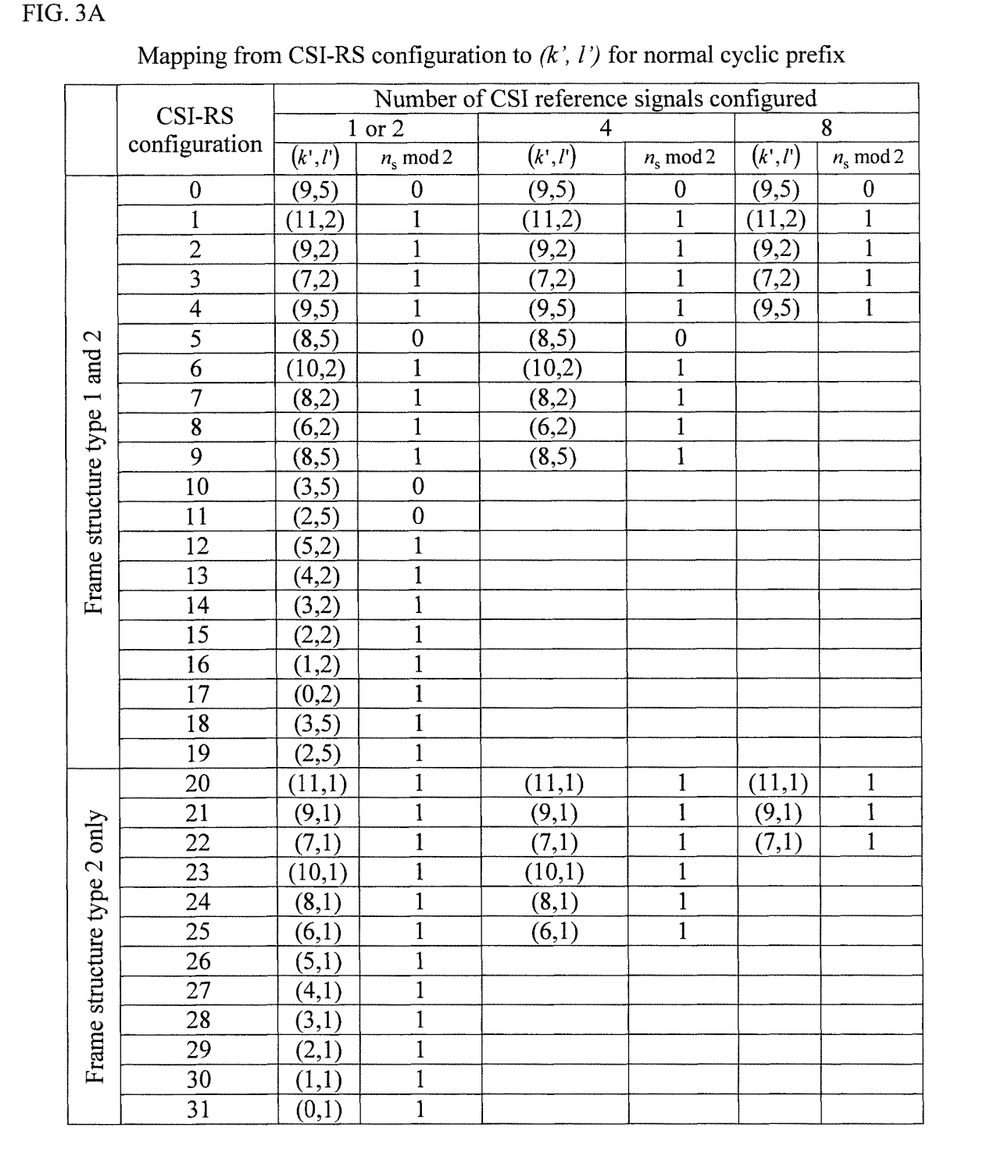
FIG. 3A is a diagram showing mapping from a CSI-RS configuration to REs for a normal cyclic prefix according to one or more embodiments of the present invention.
Figure 3B:
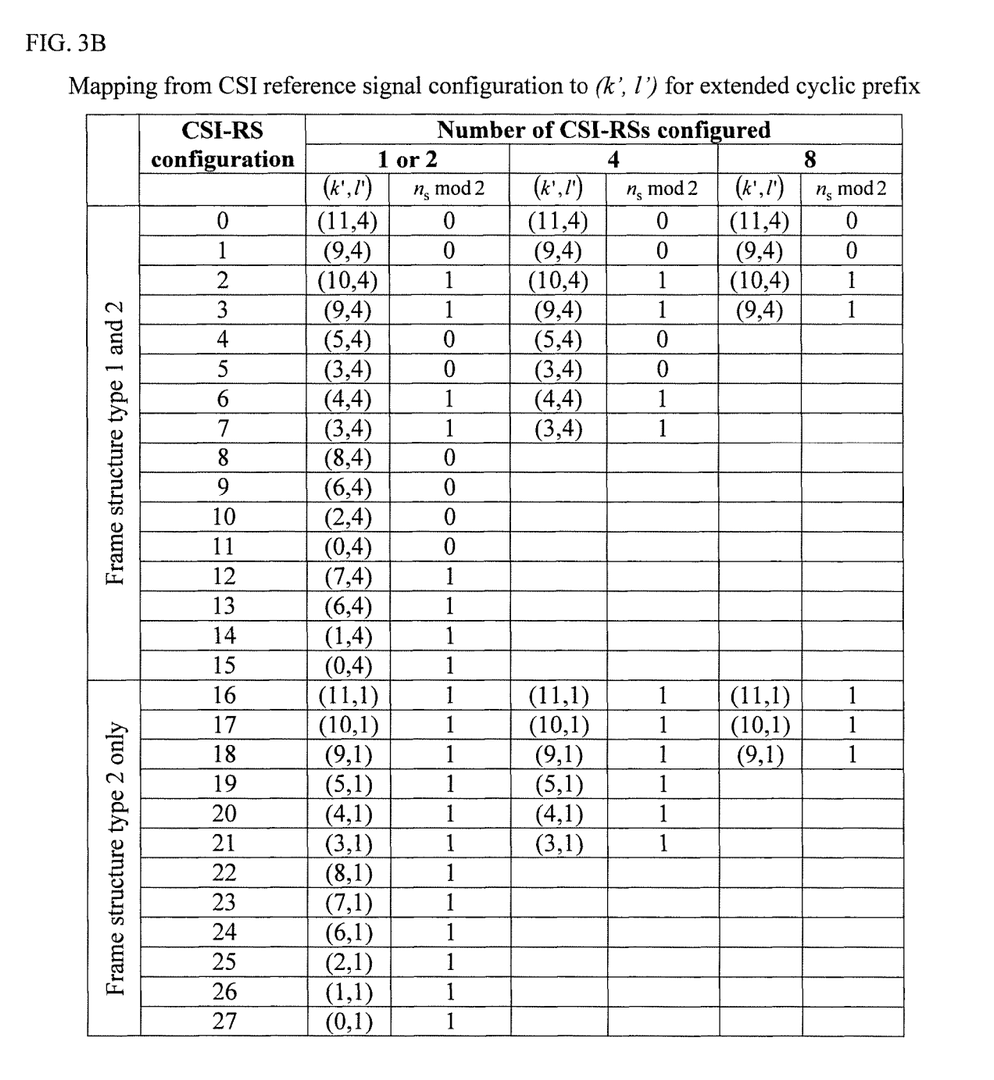
FIG. 3B is a diagram showing mapping from a CSI-RS configuration to REs for an extended cyclic prefix according to one or more embodiments of the present invention.

FIGS. 3A and 3B show mapping from a CSI-RS configuration to REs for the normal cyclic prefix and the extended cyclic prefix, respectively, according to one or more embodiments of the present invention. The tables (CSI-RS configuration) as shown in FIGS. 3A and 3B are used to report, to the UE, mapping of CSI-RS to REs in the RB. The table (CSI-RS configuration) in FIGS. 3A and 3B is defined in Table 6.10.5.2-1 and 6.10.5.2-1 respectively of the 3GPP TS 36.211.

For example, when mapping two CSI-RS APs for the normal cycle prefix as shown in FIG. 2, twenty pairs of REs allocated to the CSI-RS APs are indicated. FIG. 3A shows a table corresponding to frame structure type 1 and 2 including indexes 0-19 for a CSI-RS configuration (mapping information). The BS transmits to the UE one of the indexes 0-19 for a CSI-RS configuration in FIG. 3A to report which one of the twenty pairs of REs allocated to the CSI-RS APs in FIG. 2 is used.

As described above, the conventional ZP CSI-RS resource in Rel. 13 LTE supports the RE mapping for 4-port CSI-RS only. On the other hand, a ZP CSI-RS resource according to one or more embodiments of the present invention may be a flexible and configurable ZP CSI-RS resource. That is, the ZP CSI-RS resource according to one or more embodiments of the present invention may not be limited to the RE mapping for 4-port CSI-RS.

Figure 4:
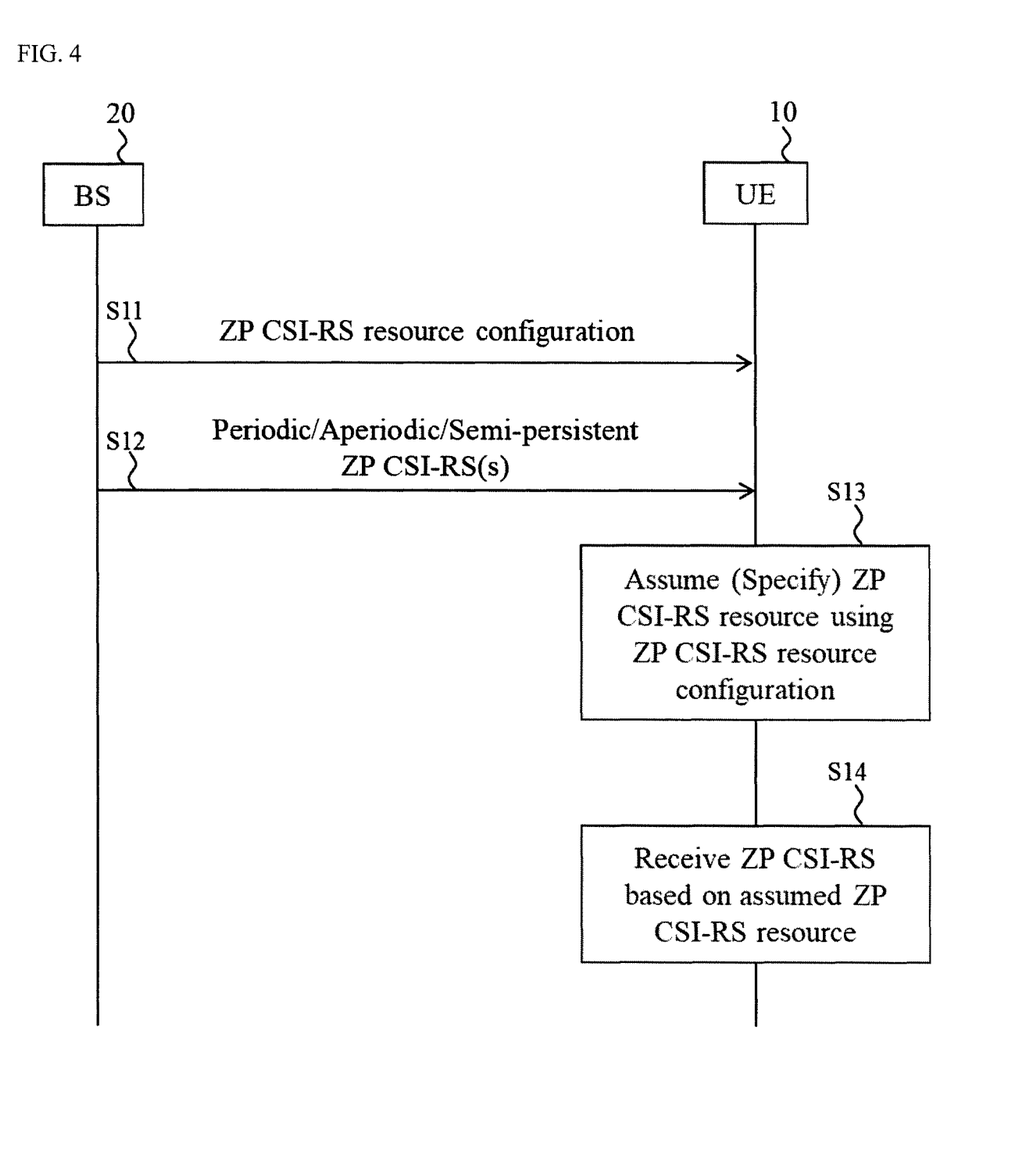
FIG. 4 is a sequence diagram showing an example operation according to one or more embodiments of the present invention.

FIG. 4 is a sequence diagram showing an example operation according to one or more embodiments of the present invention.

Figure 5:
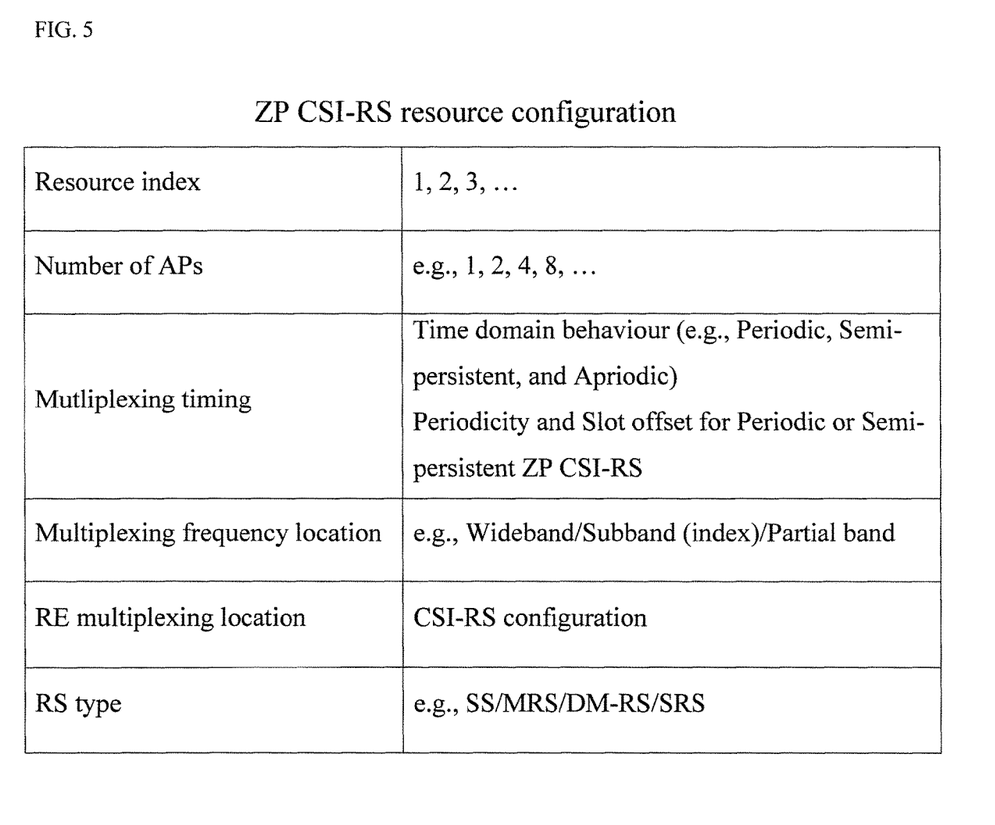
FIG. 5 is a diagram showing an example of ZP CSI-RS resource configuration information according to one or more embodiments of the present invention.

As shown in FIG. 4, at step S11, the BS 20 may transmit ZP CSI-RS resource configuration information to the UE 10 via higher layer signaling such as Radio Resource Control (RRC) signaling. As shown in FIG. 5, the ZP CSI-RS resource configuration information includes at least one of a resource index, the number of the APs, multiplexing timing, a multiplexing frequency location, a RE multiplexing location, and a Reference Signal (RS) type.

Turning back to FIG. 4, at step S12, the BS 20 may transmit periodic ZP CSI-RS, semi-persistent ZP CSI-RS, or an aperiodic ZP CSI-RS to the UE 10.

At step S13, the UE 10 may assume (specify) ZP CSI-RS resource using the received ZP CSI-RS resource configuration information. Then, at step S14, the UE 10 may receive the ZP CSI-RS based on the assumed ZP CSI-RS resource.

The ZP CSI-RS resource configuration information will be described below in detail.

(Resource Index)

The resource index is an index that identifies each ZP CSI-RS resource.

(Number of APs)

In one or more embodiments of the present invention, the number of the APs indicates the number of the APs used for the ZP CSI-RS. As shown in FIG. 5, the number of the APs may be 1, 2, 4, 8, . . . . Thus, according to one or more embodiments of the present invention, the ZP CSI-RS resource is not limited to the RE mapping for 4-port CSI-RS, and may be the RE mapping for 1/2/8-port CSI-RS ZP CSI-RS. Accordingly, the UE 10 may be configured with the number of the APs for the ZP CSI-RS.

(Multiplexing Timing)

According to one or more embodiments of the present invention, the ZP CSI-RS may be transmitted as a periodic ZP CSI-RS, a semi-persistent ZP CSI-RS, or an aperiodic ZP CSI-RS. In one or more embodiments of the present invention, the multiplexing timing indicates time domain behavior of the ZP CSI-RS such as "periodic", "semi-persistent", and "aperiodic."

The multiplexing timing of the ZP CSI-RS resource configuration information designates periodicity and a timing offset (slot offset) for the periodic ZP CSI-RS or the semi-persistent ZP CSI-RS.

The BS 20 may transmit, to the UE10, the ZP CSI-RS resource configuration information including the multiplexing timing that designates the periodicity and the timing offset for the periodic or semi-persistent ZP CSI-RS using the RRC signaling. The UE receives the periodic or semi-persistent ZP CSI-RS based on a ZP CSI-RS resource specified using the periodicity and the timing offset.

For example, activation/deactivation of the ZP CSI-RS resource may be triggered using at least one of Media Access Control Control Element (MAC CE) and Downlink Control Information (DCI).

For example, when the aperiodic ZP CSI-RS is transmitted, on/off of the ZP CSI-RS resource may be triggered using at least one of the MAC CE and DCI. The UE 10 receives the DCI that triggers the aperiodic ZP CSI-RS and receives the aperiodic ZP CSI-RS based on a ZP CSI-RS resource specified using the DCI.

(Multiplexing Frequency Location)

The multiplexing frequency band of the ZP CSI-RS may be a frequency band in which the ZP CSI-RS is multiplexed. The multiplexing frequency band of the ZP CSI-RS may be notified as a wideband, a subband, or a partial band. According to one or more embodiments of the present invention, the multiplexing frequency band of the ZP CSI-RS may be notified to the UE 10.

Frequency density of the ZP CSI-RS can be also configured. For example, the UE 10 can be configured with the increased or reduced density.

(RE Multiplexing Location)

The CSI-RS configuration indicates a time/frequency-multiplexing location of the REs associated with the ZP CSI-RS in a slot (subframe). The time/frequency-multiplexing location may be a location of the REs mapped to the ZP CSI-RS by time/frequency-multiplexing in a slot. Thus, the ZP CSI-RS resource configuration information indicates a location in time and frequency domains of resource elements mapped to the ZP CSI-RS in a slot. According to one or more embodiments of the present invention, the BS 20 may notify the UE 10 of the CSI-RS configuration of the ZP CSI-RS.

(RS Type)

As shown in FIG. 5, in the RS type, for example, a Synchronization Signal (SS), a measurement RS/mobility RS (MRS), a Demodulation-Reference Signal (DM-RS), and a Sounding Reference Signal (SRS) other than the CSI-RS may be designated. The ZP CSI-RS resource may be configured with a configuration used for the SS, the MRS, the DM-RS, and the SRS.

For example, when the SS is designated in the RS type, the number of the APs, the multiplexing timing, and the multiplexing frequency location used for the SS may be designated and applied to the ZP CSI-RS resource (this can be called as ZP SS resource, ZP RS resource or ZP resource).

Furthermore, when the RE multiplexing location of the SRS is applied to the ZP resource, comb information and frequency hopping information may be notified to the UE 10.

Figure 6:
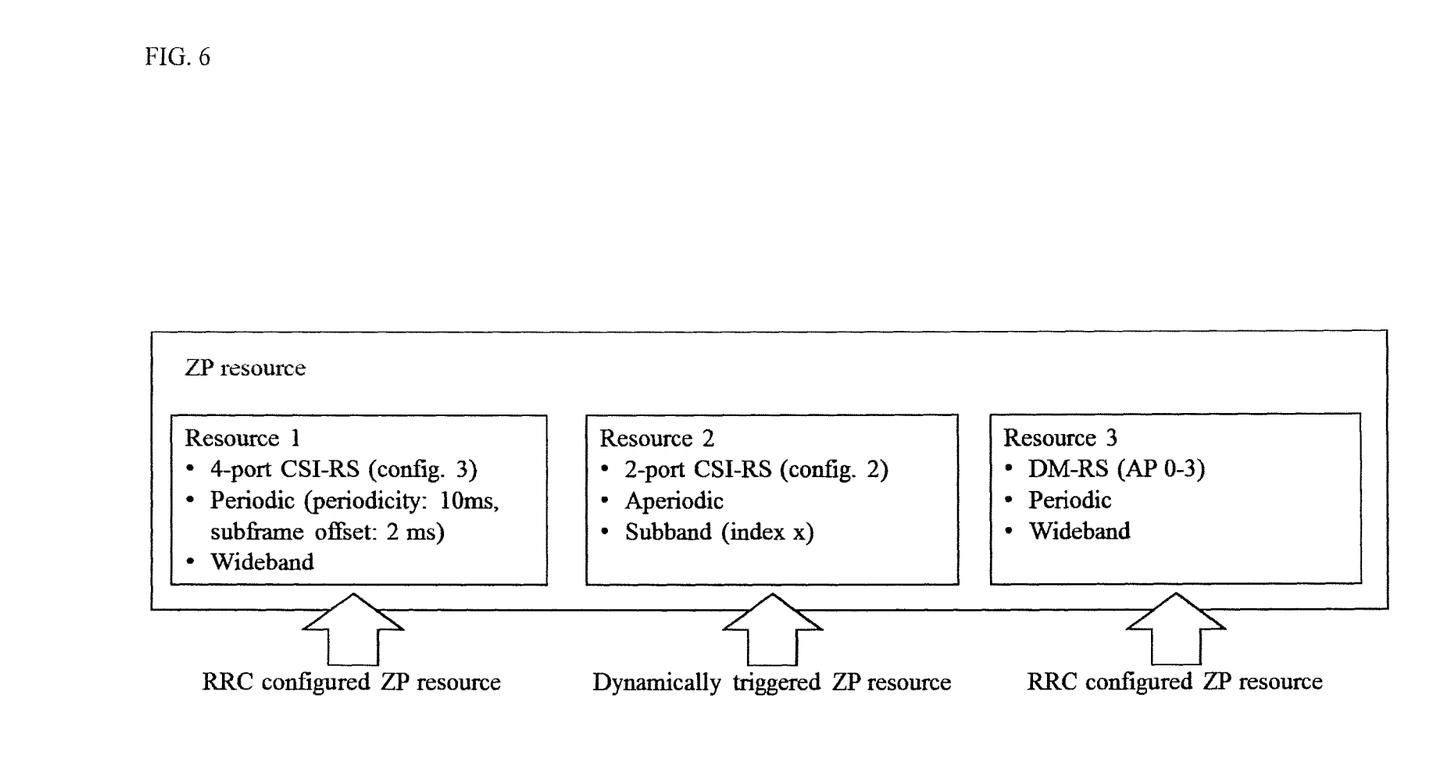
FIG. 6 is a diagram showing an example of the ZP CSI-RS resource according to one or more embodiments of the present invention.

Thus, according to one or more embodiments of the present invention, as shown in FIG. 6, in the ZP resource, the resource 1, 2, and 3 corresponding to the resource index "1", "2", and "3", respectively may have flexible parameters.

In FIG. 6, for example, in the resource 1, "4-port", "CSI-RS", "Periodic (10 msec periodicity and 2 msec subframe offset)", and "Wideband" are designated in the number of the APs, RS type, the multiplexing timing, and the multiplexing frequency location, respectively. Furthermore, the ZP resource of the resource 1 may be notified using the RRC signaling.

In FIG. 6, for example, in the resource 2, "2-port", "CSI-RS", "Aperiodic", and "Subband (index x)" are designated in the number of the APs, RS type, the multiplexing timing, and the multiplexing frequency location, respectively. Furthermore, the ZP resource of the resource 2 may be dynamically triggered with the possible preliminary RRC configuration.

In FIG. 6, for example, in the resource 3, "DM-RS (AP 0-3)", "Periodic", and "Wideband" are designated in the RS type, the multiplexing timing, and the multiplexing frequency location, respectively. The number of the APs used for the DM-RS may be applied to the number of the APs for the ZP CSI-RS. Furthermore, the ZP resource of the resource 3 may be notified using the RRC signaling.

(ZP CSI-RS Resource Configured with NZP SS/RS Resource)

According to one or more embodiments of the present invention, the ZP resource may be configured with configuration information of NZP SS/RS resource other than the NZP CSI-RS resource.

(Grouping of ZP Resources)

According to one or more embodiments of the present invention, a plurality of the ZP resources may be grouped. For example, activation/deactivation of the ZP resources and on/off of the ZP resources may be dynamically triggered in each group.

Furthermore, according to one or more embodiments of the present invention, rate matching may be performed without multiplexing the PDSCH on the ZP resource. Furthermore, according to one or more embodiments of the present invention, the PDSCH of the ZP resource may be rate-matched and punctured. The method of rate matching and puncturing can be switched, e.g., with RRC signaling.

Thus, according to one or more embodiments of the present invention, enhanced flexibility on the scheduling of ZP resources can be realized.

(Another Example)

As another example, the above methods of the flexible ZP resource allocation may be applied to an Interference Measurement Resource (IMR). For example, IMR can be configured with at least one of the resource index, number of APs, multiplexing timing, multiplexing frequency location, RE multiplexing location and RS type. That is, IMR configuration information includes at least one of the resource index, number of APs, multiplexing timing, multiplexing frequency location, RE multiplexing location and RS type. For example, IMR can be triggered dynamically.

Figure 7:
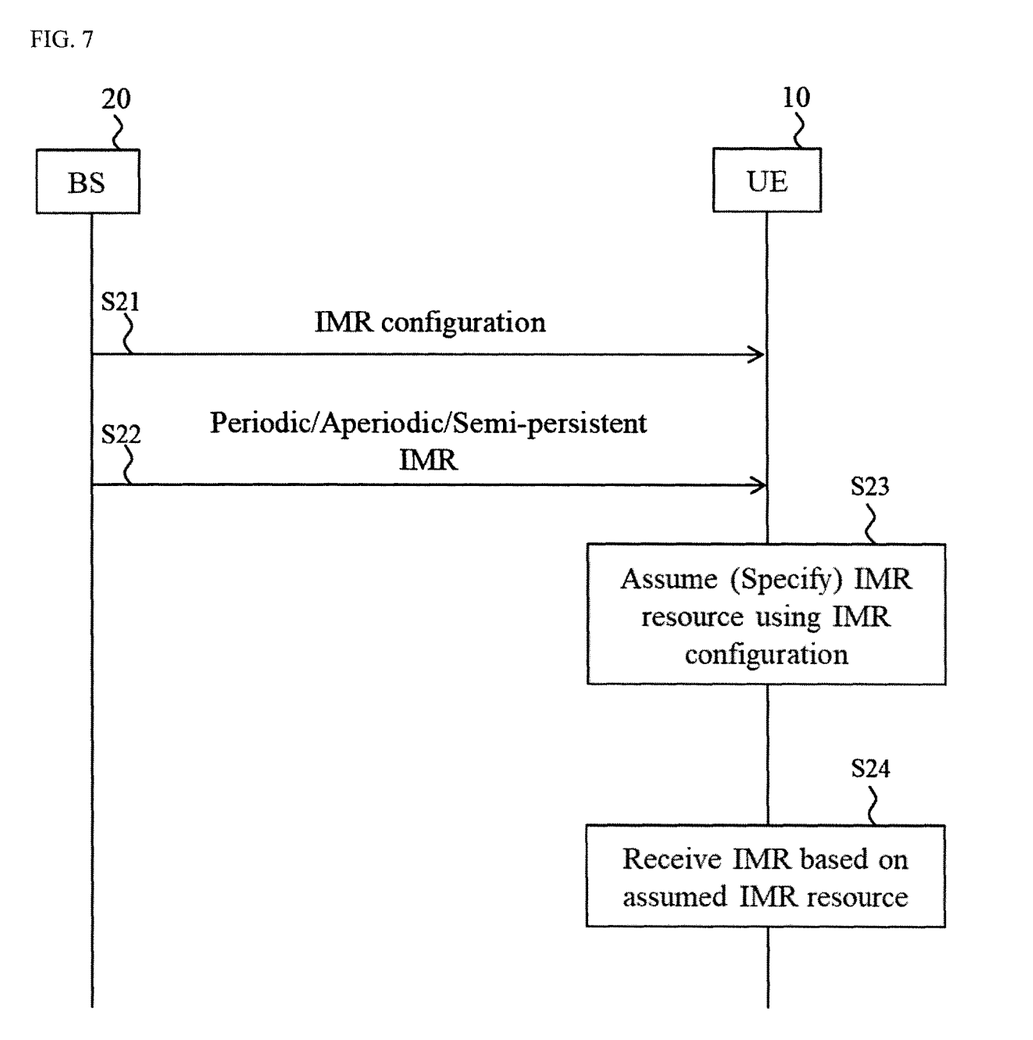
FIG. 7 is a sequence diagram showing an example operation according to one or more embodiments of another example of the present invention.

FIG. 7 is a sequence diagram showing an example operation according to one or more embodiments of another example of the present invention.

Figure 8:
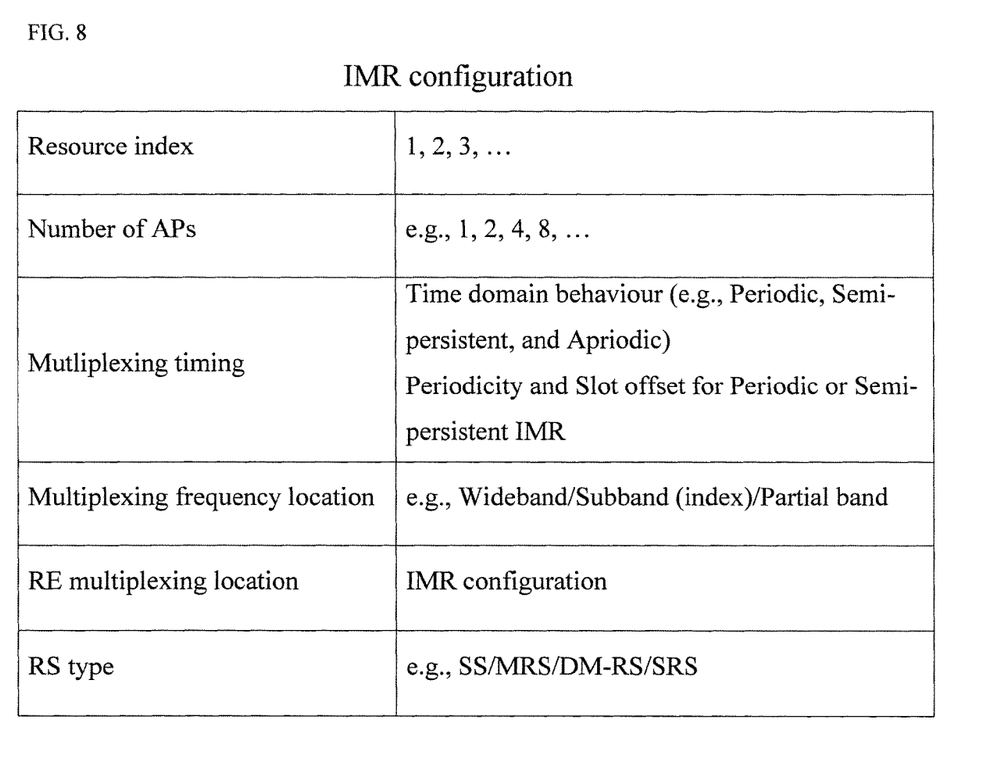
FIG. 8 is a diagram showing an example of IMR configuration information according to one or more embodiments of the present invention.

As shown in FIG. 7, at step S21, the BS 20 may transmit IMR configuration information to the UE 10 via higher layer signaling such as RRC signaling. As shown in FIG. 8, the IMR configuration information includes at least one of a resource index, the number of the APs, multiplexing timing, a multiplexing frequency location, an RE multiplexing location, and a RS type.

Turning back to FIG. 7, at step S22, the BS 20 may transmit periodic IMR, semi-persistent IMR, or an aperiodic IMR to the UE 10.

At step S23, the UE 10 may assume (specify) an IMR resource using the received IMR resource configuration information. Then, at step S14, the UE 10 may receive the IMR based on the assumed IMR resource.

For example, the BS 20 transmits, to the UE 10, the IMR configuration information using the RRC signaling. For example, when the IMR is transmitted as a periodic IMR or a semi-persistent IMR, the IMR configuration information designates periodicity and a timing offset for the periodic IMR or the semi-persistent IMR.

For example, when the IMR is transmitted as the semi-persistent IMR, the UE 10 receives at least one of MAC CE and DCI triggering activation and deactivation of the semi-persistent IMR.

For example, when the IMR is transmitted as the aperiodic IMR, the UE 10 receives DCI that triggers the aperiodic IMR. The UE 10 receives the IMR based on a IMR resource specified using the DCI.

For example, the IMR resource configuration information indicates a frequency band on which the IMR is multiplexed. The frequency band may be a wideband, a subband, or a partial band. For example, the IMR resource configuration information indicates frequency density of the IMR. For example, the IMR resource configuration information indicates a location in time and frequency domains of resource elements mapped to the IMR in a slot. For example, the IMR resource configuration information indicates the number of antenna ports of the BS used for transmission of the IMR.

For example, an IMR resource of the IMR is not multiplexed on a Physical Downlink Shared Channel (PDSCH) and the IMR resource is rate matched.

(Configuration of Base Station)

Figure 9:
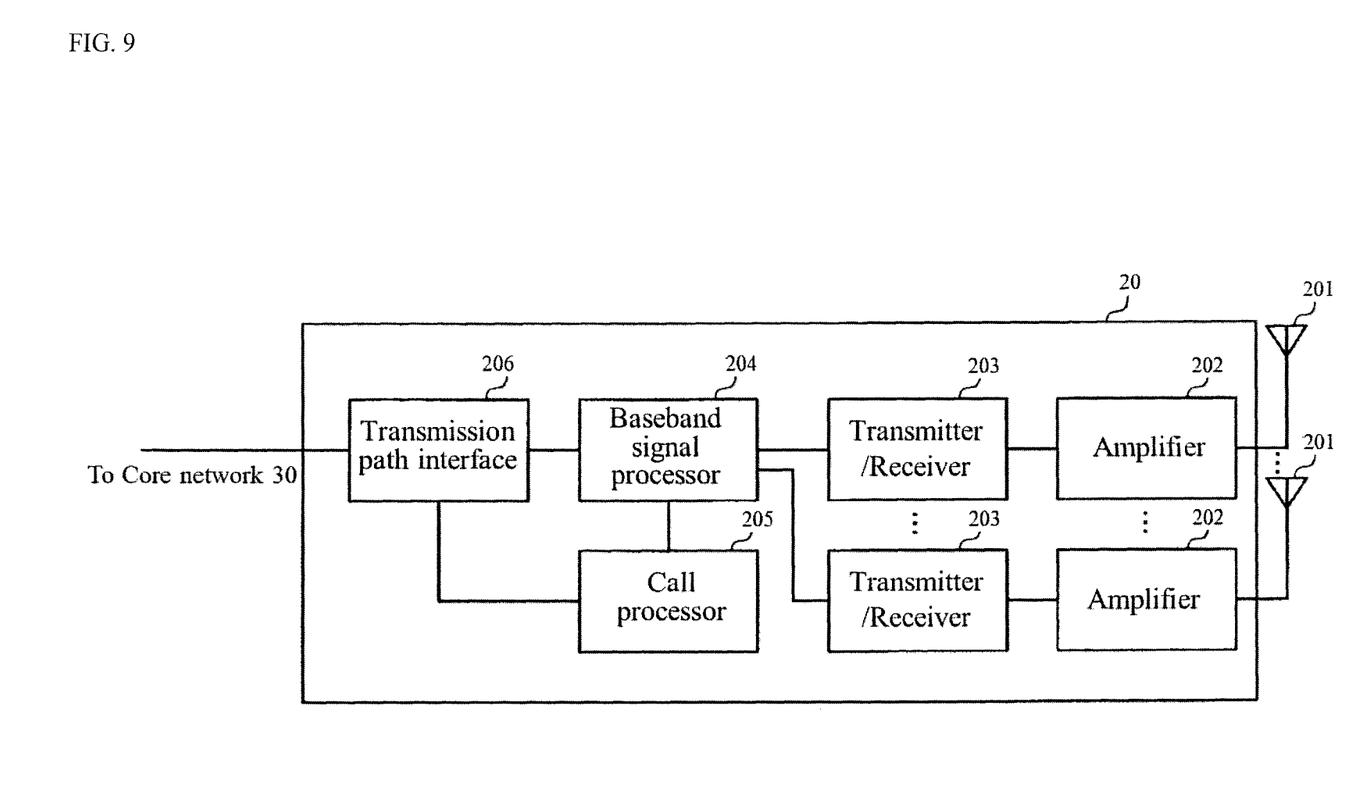
FIG. 9 is a diagram showing a schematic configuration of the BS according to one or more embodiments of the present invention.

The BS 20 according to one or more embodiments of the present invention will be described below with reference to FIG. 9. FIG. 9 is a diagram illustrating a schematic configuration of the BS 20 according to one or more embodiments of the present invention. The BS 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the BS 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, Medium Access Control (MAC) retransmission control, including, for example, HARQ transmission processing, scheduling, transport format selection, channel coding, inverse fast Fourier transform (IFFT) processing, and pre-coding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are pre-coded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the BS 20, and manages the radio resources.

(Configuration of User Equipment)

Figure 10:
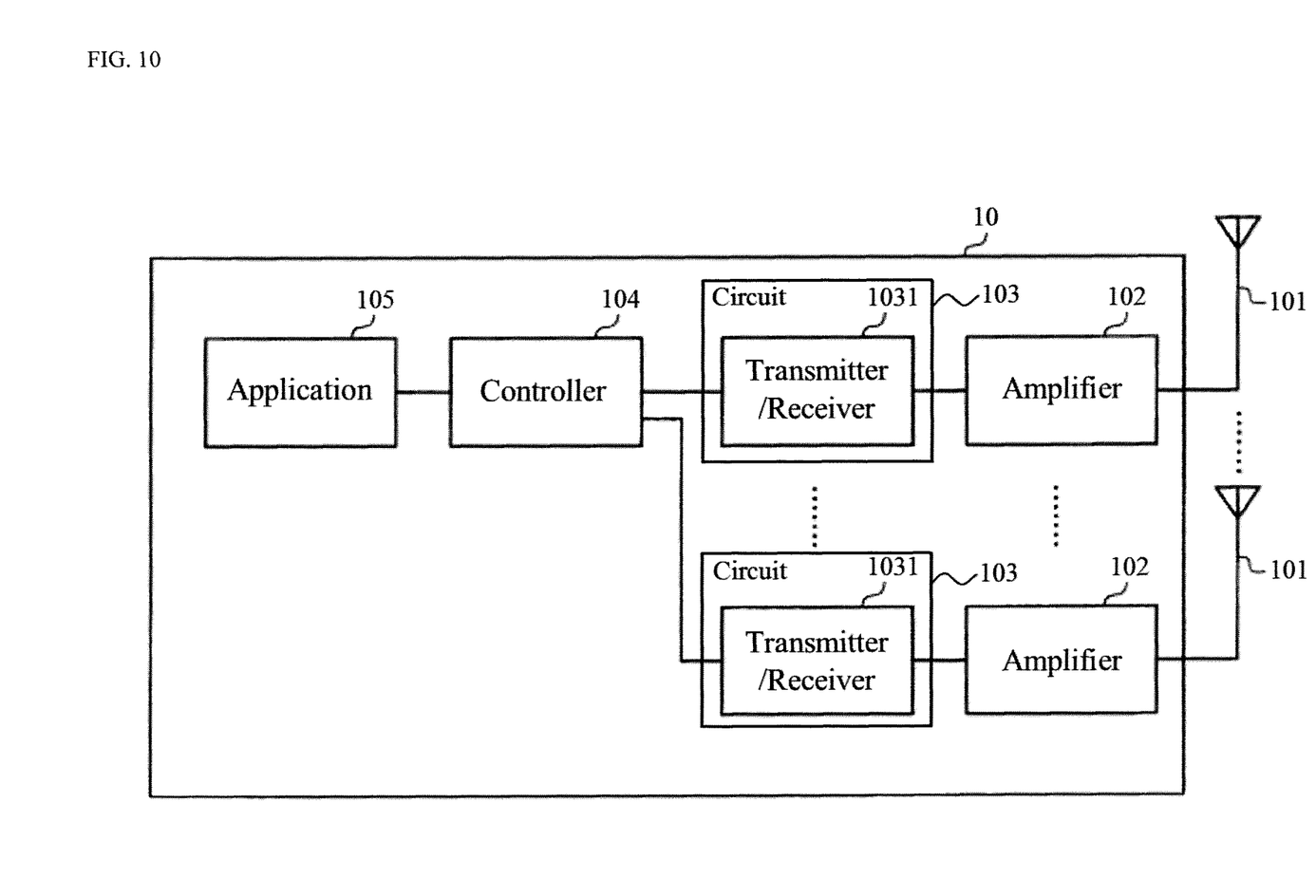
FIG. 10 is a diagram showing a schematic configuration of the UE according to one or more embodiments of the present invention.

The UE 10 according to one or more embodiments of the present invention will be described below with reference to FIG. 10. FIG. 10 is a schematic configuration of the UE 10 according to one or more embodiments of the present invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

(Another Example)

One or more embodiments of the present invention may be used for each of the uplink and the downlink independently. One or more embodiments of the present invention may be also used for both of the uplink and the downlink in common.

Although the present disclosure mainly described examples of a channel and signaling scheme based on NR, the present invention is not limited thereto. One or more embodiments of the present invention may apply to another channel and signaling scheme having the same functions as LTE/LTE-A and a newly defined channel and signaling scheme.

Although the present disclosure mainly described examples of channel estimation and CSI feedback scheme based on the RS, the present invention is not limited thereto. One or more embodiments of the present invention may apply to another synchronization signal, reference signal, and physical channel such as CSI-RS, synchronization signal (SS), measurement RS (MRS), mobility RS (MRS), and beam RS (BRS).

Although the present disclosure mainly described examples of various signaling methods, the signaling according to one or more embodiments of the present invention may be explicitly or implicitly performed.

Although the present disclosure mainly described examples of various signaling methods, the signaling according to one or more embodiments of the present invention may be the higher layer signaling such as the RRC signaling and/or the lower layer signaling such as Downlink Control Information (DCI) and MAC Control Element (CE). Furthermore, the signaling according to one or more embodiments of the present invention may use a Master Information Block (MIB) and/or a System Information Block (SIB). For example, at least two of the RRC, the DCI, and the MAC CE may be used in combination as the signaling according to one or more embodiments of the present invention.

Although the present disclosure described examples of the beamformed RS (RS transmission using the beam), whether the physical signal/channel is beamformed may be transparent for the UE. The beamformed RS and the beamformed signal may be called the RS and the signal, respectively. Furthermore, the beamformed RS may be referred to as a RS resource. Furthermore, the beam selection may be referred to as resource selection. Furthermore, the Beam Index may be referred to as a resource index (indicator) or an antenna port index.

The UE antennas according to one or more embodiments of the present invention may apply to the UE including one dimensional antennas, planer antennas, and predetermined three dimensional antennas.

In one or more embodiments of the present invention, the Resource Block (RB) and a subcarrier in the present disclosure may be replaced with each other. A subframe, a symbol, and a slot may be replaced with each other.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A user equipment (UE) in a wireless communication system comprising:
    a receiver that receives, from a base station (BS), Zero Power (ZP) Channel State Information-Reference Signal (CSI-RS) resource configuration information, and a ZP CSI-RS,
    wherein the ZP CSI-RS is transmitted as a periodic ZP CSI-RS, a semi-persistent ZP CSI-RS, or an aperiodic ZP CSI-RS,
    wherein when the ZP CSI-RS is transmitted as the periodic ZP CSI-RS or the semi-persistent ZP CSI-RS, the ZP CSI-RS resource configuration information designates periodicity and a timing offset for the periodic ZP CSI-RS or the semi-persistent ZP CSI-RS,
    wherein the receiver receives the ZP CSI-RS based on a ZP CSI-RS resource specified using the periodicity and the timing offset,
    wherein the ZP CSI-RS resource configuration information indicates a location of the ZP CSI- RS in a slot, which is indicated with a location of resource elements in time and frequency domains,
    wherein when the ZP CSI-RS is transmitted as the aperiodic ZP CSI-RS, the receiver receives DCI that triggers the aperiodic ZP CSI-RS,
    wherein the receiver receives the aperiodic ZP CSI-RS based on a ZP CSI-RS resource specified using the DCI,
    wherein a plurality of the ZP CSI-RS resources of the aperiodic ZP CSI-RS are grouped into a first group and a second group, and
    wherein all of the ZP CSI-RS resources within the first group and all of the ZP CSI-RS resources within the second group are activated/deactivated by being triggered by a common DCI.

2. The UE according to claim 1, wherein the ZP CSI-RS resource configuration information is transmitted via Radio Resource Control (RRC) signaling.

3. A wireless communication method comprising:
receiving with a user equipment (UE) from a base station, Zero Power (ZP) Channel State Information-Reference Signal (CSI-RS) resource configuration information; and
receiving, with the UE, a ZP CSI-RS from the BS, wherein the ZP CSI-RS is transmitted as a periodic ZP CSI-RS, a semi-persistent ZP CSI-RS, or an aperiodic ZP CSI-RS,
wherein when the ZP-CSI-RS is transmitted as the periodic ZP CSI-RS or the semi-persistent ZP-CSI-RS, the ZP CSI-RS resource configuration information designates periodicity and a timing offset for the periodic ZP CSI-RS or the semi-persistent ZP-CSI-RS,
wherein the receiving receives the ZP CSI-RS based on a ZP CSI-RS resource specified using the periodicity and the timing offset,
wherein the ZP CSI-RS resource configuration information indicates a location of the ZP CSI- RS in a slot, which is indicated with a location of resource elements in time and frequency domains,
wherein when the ZP CSI-RS is transmitted as the aperiodic ZP CSI-RS, the UE receives DCI that triggers the aperiodic ZP CSI-RS,
wherein the UE receives the aperiodic ZP CSI-RS based on a ZP CSI-RS resource specified using the DCI,
wherein a plurality of the ZP CSI-RS resources of the aperiodic ZP CSI-RS are grouped into a first group and a second group, and
wherein all of the ZP CSI-RS resources within the first group and all of the ZP CSI-RS resources within the second group are activated/deactivated by being triggered by a common DCI.

4. A base station (BS) in a wireless communication system comprising:
a transmitter that transmits, to a user equipment (UE), Zero Power (ZP) Channel State Information-Reference Signal (CSI-RS) resource configuration information, and a ZP CSI-RS,
wherein the transmitter transmits the ZP CSI-RS as a periodic ZP CSI-RS, a semi-persistent ZP CSI-RS, or an aperiodic ZP CSI-RS,
wherein when the transmitter transmits the ZP CSI-RS as the periodic ZP CSI-RS or the semi-persistent ZP CSI-RS, the ZP CSI-RS resource configuration information designates periodicity and a timing offset for the periodic ZP CSI-RS or the semi-persistent ZP CSI-RS,
wherein the ZP CSI-RS resource configuration information indicates a location of the ZP CSI-RS in a slot, which is indicated with a location of resource elements in time and frequency domains,
wherein when the ZP CSI-RS is transmitted as the aperiodic ZP CSI-RS, the transmitter transmits DCI that triggers the aperiodic ZP CSI-RS,
wherein the DCI is used, at the UE, to specify a ZP CSI-RS resource to receive the aperiodic ZP CSI-RS,
wherein a plurality of the ZP CSI-RS resources of the aperiodic ZP CSI-RS are grouped into a first group and a second group, and
wherein all of the ZP CSI-RS resources within the first group and all of the ZP CSI-RS resources within the second group are activated/deactivated by being triggered by a common DCI.

5. A wireless communication system comprising:
a base station (BS) comprising:
a transmitter that transmits, to a user equipment (UE), Zero Power (ZP) Channel State Information-Reference Signal (CSI-RS) resource configuration information, and a ZP CSI-RS,
wherein the transmitter transmits the ZP CSI-RS as a periodic ZP CSI-RS, a semi-persistent ZP CSI-RS, or an aperiodic ZP CSI-RS,
wherein when the transmitter transmits the ZP CSI-RS as the periodic ZP CSI-RS or the semi-persistent ZP CSI-RS, the ZP CSI-RS resource configuration information designates periodicity and a timing offset for the periodic ZP CSI-RS or the semi-persistent ZP CSI-RS,
wherein the ZP CSI-RS resource configuration information indicates a location of the ZP CSI-RS in a slot, which is indicated with a location of resource elements in time and frequency domains, and
wherein when the ZP CSI-RS is transmitted as the aperiodic ZP CSI-RS, the transmitter transmits DCI that triggers the aperiodic ZP CSI-RS; and
a user equipment (UE) comprising:
a receiver that receives, from the BS, the ZP CSI-RS resource configuration information, and the ZP CSI-RS,
wherein when the ZP CSI-RS is transmitted as the periodic ZP CSI-RS or the semi-persistent ZP CSI-RS, the receiver receives the ZP CSI-RS based on a ZP CSI-RS resource specified using the periodicity and the timing offset,
wherein when the ZP CSI-RS is transmitted as the aperiodic ZP CSI-RS, the receiver receives DCI that triggers the aperiodic ZP CSI-RS,
wherein the receiver receives the aperiodic ZP CSI-RS based on a ZP CSI-RS resource specified using the DCI,
wherein a plurality of the ZP CSI-RS resources of the aperiodic ZP CSI-RS are grouped into a first group and a second group, and
wherein all of the ZP CSI-RS resources within the first group and all of the ZP CSI-RS resources within the second group are activated/deactivated by being triggered by a common DCI.

* * * * *